(12) United States Patent
Lefurgy

(10) Patent No.: US 9,779,010 B2
(45) Date of Patent: *Oct. 3, 2017

(54) REGISTRATION-BASED REMOTE DEBUG WATCH AND MODIFY

(71) Applicant: INTERNATIONAL BUSINESS MACHINES CORPORATION, Armonk, NY (US)

(72) Inventor: Charles R. Lefurgy, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/931,934

(22) Filed: Nov. 4, 2015

(65) Prior Publication Data

US 2016/0077952 A1    Mar. 17, 2016

Related U.S. Application Data

(63) Continuation of application No. 13/957,528, filed on Aug. 2, 2013, now Pat. No. 9,251,038, which is a continuation of application No. 12/908,100, filed on Oct. 20, 2010, now Pat. No. 8,589,887.

(51) Int. Cl.
*G06F 9/44* (2006.01)
*G06F 11/36* (2006.01)

(52) U.S. Cl.
CPC ...... *G06F 11/3648* (2013.01); *G06F 11/3636* (2013.01); *G06F 11/3644* (2013.01); *G06F 11/3664* (2013.01); *G06F 11/3696* (2013.01)

(58) Field of Classification Search
USPC ......................................................... 717/128
See application file for complete search history.

(56) References Cited

U.S. PATENT DOCUMENTS

| | | | | |
|---|---|---|---|---|
| 6,397,224 | B1 * | 5/2002 | Zubeldia | G06F 19/322 |
| 6,412,106 | B1 * | 6/2002 | Leask | G06F 11/3664 |
| | | | | 714/E11.217 |
| 6,795,963 | B1 * | 9/2004 | Andersen | G06F 11/3628 |
| | | | | 714/E11.209 |
| 6,892,325 | B2 | 5/2005 | Bates et al. | |
| 6,964,036 | B2 | 11/2005 | Bates et al. | |
| 7,487,494 | B2 | 2/2009 | Chan et al. | |
| 8,589,887 | B2 | 11/2013 | Lefurgy | |
| 2002/0129337 | A1 | 9/2002 | Evans et al. | |
| 2003/0074650 | A1 * | 4/2003 | Akgul | G06F 11/3624 |
| | | | | 717/129 |

(Continued)

OTHER PUBLICATIONS

Cantrill, et al., "Dynamic Instrumentation of Production Systems" USENIX 2004 Annual Technical Conference, 2004, pp. 15-28, Boston, MA.

(Continued)

*Primary Examiner* — Hang Pan
(74) *Attorney, Agent, or Firm* — Mitch Harris, Atty at Law, LLC; Andrew M. Harris; Mercedes L. Hobson

(57) ABSTRACT

A remote debugging technique provides anonymity of program variables and selective debugging capability by providing a registration facility by which program variables are registered locally with a debugging module. An external program then communicates with the debugging modules and observes and/or modifies the program variables by specifying either an index or a variable name. The need to publish symbols is thereby averted and only the variables that a developer is interested in observing need be registered.

20 Claims, 4 Drawing Sheets

(56) References Cited

U.S. PATENT DOCUMENTS

| | | |
|---|---|---|
| 2003/0233634 A1* | 12/2003 | Carrez ............... G06F 11/3664 717/124 |
| 2007/0113218 A1* | 5/2007 | Nolan .................. G06F 11/362 717/124 |
| 2007/0288901 A1 | 12/2007 | Lev et al. |
| 2008/0134156 A1 | 6/2008 | Osminer et al. |
| 2008/0222612 A1 | 9/2008 | Glotzbach et al. |
| 2013/0318502 A1 | 11/2013 | Lefurgy |

OTHER PUBLICATIONS

Stallman, et al., "Debugging with GDB", 2010, pp. 1-550 (pp. 1-555 in pdf), Ninth Edition, Version 7.2.50.20100909, Free Software Foundation, Boston, MA.
ModelSIM Reference Manual, May 2008, pp. 1-346, Mentor Graphics, Wilsonville, OR.
Sidwell, et al., "Non-stop Multi-Threaded Debugging in GDB", GCC Developers Summit 2008 , pp. 1-11, Ottowa, CA.
Wallach, "Gemini Lite: A Non-Intrusive Debugger for Windows NT", Aug. 2000, Unnumbered (pp. 1-10 in pdf), 4th USENIX Windows Systems Symposium, Seattle, WA.
Office Action in U.S. Appl. No. 12/908,100 mailed on Mar. 13, 2013 (pp. 1-12 in pdf).
Notice of Allowance in U.S. Appl. No. 12/908,100 mailed on Jul. 15, 2013 (pp. 1-15 pages in pdf).
Office Action in U.S. Appl. No. 13/957,528 mailed on Jun. 10, 2015, 14 pages (pp. 1-14 in pdf).
Notice of Allowance in U.S. Appl. No. 13/957,528 mailed on Oct. 9, 2015, 17 pages (pp. 1-17 in pdf).

\* cited by examiner

REGISTRATION-BASED REMOTE DEBUG WATCH AND MODIFY

This U.S. patent application is a Continuation of U.S. patent application Ser. No. 13/957,528 filed on Aug. 2, 2013, and published as U.S. Patent Publication No. U.S. 20130318502 on Nov. 28, 2013, which is a Continuation of U.S. patent application Ser. No. 12/908,100 filed on Oct. 20, 2010, and issued as U.S. Pat. No. 8,589,887 on Nov. 19, 2013, and claims priority thereto under 35 U.S.C. §120. This U.S. patent application claims priority under 35 U.S.C. §120 to the above-referenced U.S. patent applications, the disclosures of which are incorporated herein by reference.

BACKGROUND OF THE INVENTION

1. Field of the Invention

The present invention is related to program debuggers, and more specifically to a program debugger that provides remote watch and modify features by providing a registration facility.

2. Description of Related Art

Debuggers are used in both development and field environments to determine if program code is operating properly, and to investigate faults that cause improper program behavior that is apparent, such as non-terminating behavior. Debuggers generally provide views of the various aspects of internal program function and structure, such as traces of program execution path and views of program variables, in addition to hardware observation capabilities such as register and memory value snooping.

In order to provide the capabilities pointed out above, development systems typically provide the program developer with the capability of generating a debugging version of program code, which contains information allowing a debugging program to determine symbolic links to the program code and data storage areas. The symbol information may be embedded in the debug version of the program, or may be stored in one or more external files. A non-debug version of the program code is typically devoid of symbolic information.

BRIEF SUMMARY OF THE INVENTION

The invention is embodied in a method, computer system and computer program product that provide for observing data values within storage locations of a computer program during execution of the computer program within the computer system. The method is a method of operation of the computer system and the computer program product is a set of program instructions embodied in tangible form in computer readable storage media such as optical, magnetic or electrical removable or non-removable memory.

The computer program registers individual storage locations that store the data values with a debugging module located in the same address space as the computer program. The debugging module receives requests from an external program that specify data values corresponding to storage locations that have been registered by the registering. In response to the requests, the debugging module retrieves or modifies the particular data values and for read requests, sends the particular data values from the debugging module to the external program, where the data values are displayed.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention relates to methods and programs that provide remote debugging capability by permitting an external debugging program to view and/or modify program variables (i.e., data values stored in program storage locations). The viewable/modifiable program variables are restricted to variables that have been registered with a debugging module located in the same memory space as the computer program. The debugging module can be selectively linked with the program, so that non-debug versions of the program do not contain the debugging module and the calls to register the program variables can either be stubbed or conditioned on a debugging constant so that the non-debug version can be generated from the same program code as the debug version. Permissions are supported by the debug module, so that the program may register some program variables as read-only and others as read-write (read-modify). Since no breakpoints are required to observe or modify the program variables, the debugging scheme is suitable for debugging real-time systems such as control systems. Also, by providing/altering the program values from within the program space using a debugging module, no overhead is present unless the debug module is actually retrieving or modifying a program variable, which also makes the debugging scheme useful in debugging real-time systems. Further, by registering only key variables, both security and compactness are achieved, since only those variables the programmer wishes to expose are exposed. The compactness of the scheme is suitable for embedded systems, in which the large amount of memory required for complete symbol tables may exceed the resources available.

Figure 1:
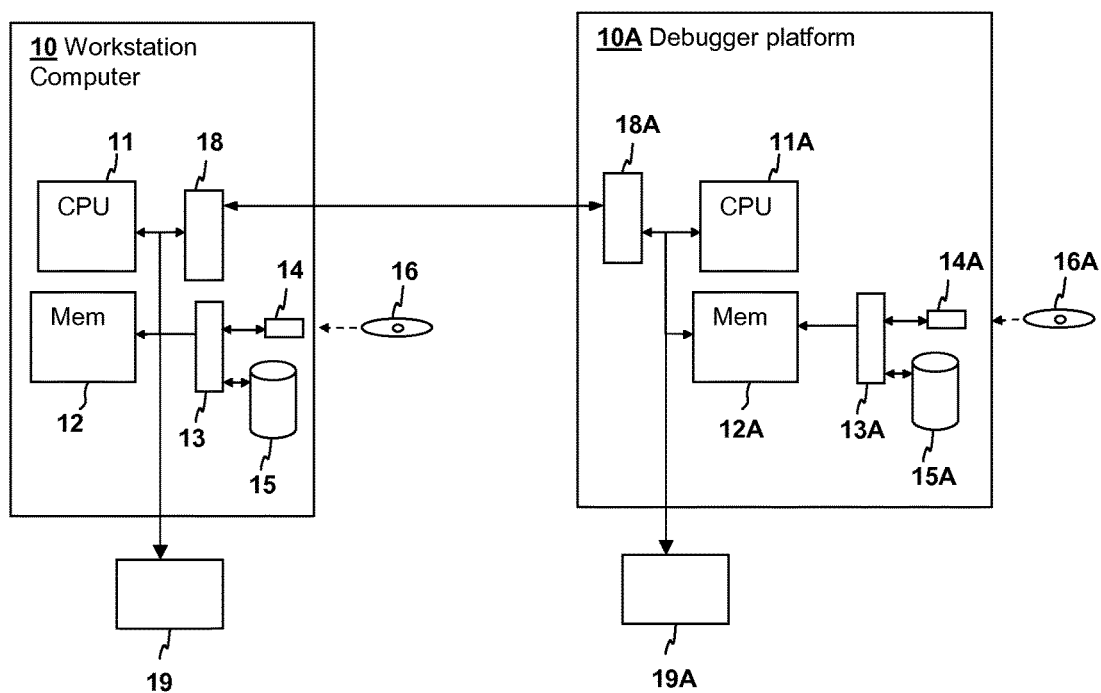
FIG. 1 is a block diagram illustrating a processing system in which program code according to an embodiment of the present invention is generated and executed.

Referring now to FIG. 1, a computer system in which techniques in accordance with an embodiment of the present invention are practiced, is shown. The depicted computer system includes a workstation computer system 10 coupled to a debugger platform 10A. The depicted computer system configuration is illustrative, and processing systems in accordance with other embodiments of the present invention include special purpose computer systems in place of workstation 10, and/or other systems in which the debugger is executed by the same computer system. A processor 11 is coupled to a memory 12, which contains program instructions implementing a computer program executed by processor 11 that, in at least a debug version, includes debug functionality in accordance with an embodiment of the present invention as described in detail below. Debugger platform 10A includes a processor 11A that is coupled to a memory 12A for storing data and program code implementing a debugger that communicates with one or more debug modules in the computer program executed by workstation computer system 10. Processor 11 in workstation computer 10 is also coupled to a storage interface 13, which couples processor 11 and memory 12 to storage devices such as hard disc drive 15 and an optical drive 14. Embodiments of the invention include computer program products that contain the debug module of the present invention stored in memory 12 as well as stored on tangible media such as a CD-ROM 16 that may be inserted into optical drive 14 to transfer computer program and other programs memory 12 for execution by processor 11. Similarly, debugger platform 10A includes hard disk drives 15 and optical drives 14 for accepting media such as optical storage 16A containing the debugger program and other data and/or program code. The illustrated workstation computer system also includes input/output (I/O) interfaces and devices 19 such as mice and keyboards for receiving user input and graphical displays for displaying information, such as user interfaces constituting output of the computer program being debugged. Further, debugger platform 10A also includes input/output (I/O) interfaces and devices 19A such as mice and keyboards for receiving user input and graphical displays for displaying information, such as user interfaces of the debugger, that in particular, displays values of program variables of a program executing within workstation computer 10.

Workstation computer system 10 is coupled to debugger platform 10A by an interface 18 that couples to interface 18A, through a wired, optical or wireless connection that may be proprietary, or take the form of a standardized serial or parallel bus such as an Ethernet connection. Debugger platform 10A sends commands to workstation computer system 10. The commands include commands to examine program variables of a program executing within workstation computer system 10 and commands to modify those program variables, among other commands. While the system illustrated in FIG. 1 is a remote computer debugging arrangement, it is understood that in accordance with other embodiments of the present invention, the debugger may be executed within workstation computer system 10. Further, in other architectures such as in a distributed processing system, portions of the target program, i.e., the computer program being debugged, and the debugger program that communicates with the target program may be executed by multiple processors within the distributed processing system and may be partially executed by the same processor and partially executed by different processors. Therefore, the terms remote and local as used herein are referring generally to the local program, local tables of variables and local debug module in the sense that they are associated with and locate generally in the same memory space as the computer program, while the remote tables and remote debugger are generally located in at least a different memory space, if not in a separate computer system.

Figure 2:
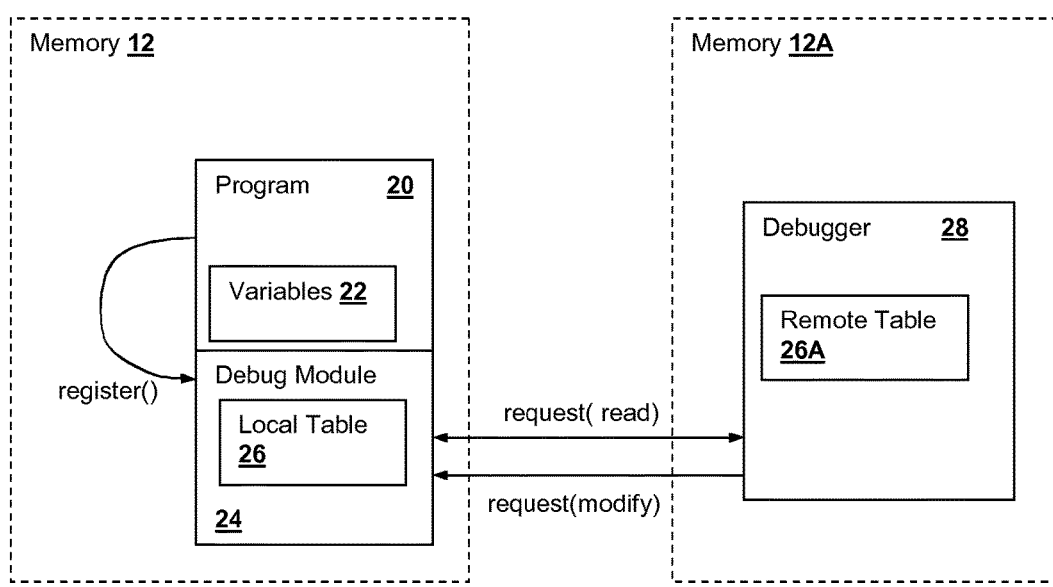
FIG. 2 is a memory diagram illustrating program code and data organization in accordance with an embodiment of the present invention.

Referring now to FIG. 2, an arrangement of program code and data within memory 12 of workstation computer system 10 and program code and data within memory 12A of debugger platform 10A is shown in accordance with an embodiment of the present invention. The computer program 20 is located in memory 12 is executed by workstation computer system 10, and includes program variables 22, which in the sense of the present invention may include constants and other data space such as allocated memory blocks referred to by pointers or other reference. Debugger 28 is executed by debug platform 10A and communicates with a debug module 24 associated with computer program 20. In the depicted embodiment, debug module 24 is linked with computer program 20 and forms part of the loadable image of computer program 20. However, in other embodiments of the present invention, debug module 24 may be a dynamic library or other operating facility that is not part of the loadable image of computer program 20.

In order to make a program variable accessible to debugger 28 executable code within computer program 20 calls an application programming interface (API) of debug module 24 that registers program variables for debugging purposes. Therefore, computer program 20 has complete control over which variables are exposed to debugger 28. The API used to register program variables of computer program 20 is illustrated as register( ), which may be of the form:

register(variable_name, variable_reference, size_type, flags), where variable_name is the name of the program variable, variable_reference is the storage location of the program variable, the size_type field is an indication of the size and/or type of the program variable, and flags are access and handling flags such as read permission, write permission and whether the program variable is being registered under its human-comprehensible name or whether a hash or index should be used instead. In general, embodiments of the present invention will either implement hashing/indexing of program variable names, or will use the variable names as references, but as illustrated above for generality, anonymity can be selected on an individual basis. If indexing is used, the anonymized variables will be maintained in a separate list by index, and the variable_name argument is not needed. The register( ) API call thus may alternatively be of the form:

register(variable_reference, size_type, flags).

The variable_reference argument is needed in systems in which or variable for which a pointer or other reference must be passed for the debug module to be able to access the storage location containing the program variable. In other systems, such as interpretive languages or scripting languages, the reference is made entirely by the variable name. Therefore, in such systems, the variable_name argument and not the variable_reference argument would be supplied to the register( ) API:

register(variable_name, size_type, flags).

A collection of all of the program variables registered by computer program 20 is maintained in a local table 26, which may be contained within debug module 24, within a data area of computer program 20 or may be in a separate location accessible by debug module 24. An exemplary table suitable for use as local table is shown in Table I below, in which the first row is merely explanatory and not required.

TABLE I

| Variable Name | Storage Location | Size (or type) | Flags |
|---|---|---|---|
| icount | 00894400A0000100 | 8 | +r, +w |
| user_data[0] | 00894400A00001A0 | 1024 | +r |
| profile | 00894400A0000400 | 64 | +r, +w |

The first column contains the variable name, which is used to look up variables for which access is requested by debugger 28, which are shown as request(read) and request (modify) requests in the illustration. Alternatively, as pointed out above, Table I can contain anonymized values for accessing the program variables, such as an index as illustrated in Table II below:

TABLE II

| 0 | 00894400A0000100 | 8    | +r, +w |
|---|------------------|------|--------|
| 1 | 00894400A00001A0 | 1024 | +r     |
| 2 | 00894400A0000400 | 64   | +r, +w | or a hash value as illustrated in Table III below:

TABLE III

| soenirto#472 | 00894400A0000100 | 8    | +r, +w |
|--------------|------------------|------|--------|
| to2es % &12  | 00894400A00001A0 | 1024 | +r     |
| 23st@352s1   | 00894400A0000400 | 64   | +r, +w |

For interpretive and scripting languages, as noted above, the storage location is not directly used by the debug module, and references are made by variable name. In such implementations local table 26 may be of the form shown in Table IV below:

TABLE IV

| Variable Name | Size (or type) | Flags  |
|---------------|----------------|--------|
| icount        | 8              | +r, +w |
| user_data[0]  | 1024           | +r     |

Debugger 28 also has an associated table, remote table 26A, that may match local table 26, or may be different, in that the flags value is not needed, nor is the actual pointer to the storage location either needed to function, nor desirable to expose external to computer program 20. In one embodiment, remote table 26A is not needed, if the values in local table 26 are stored by index and it is desirable to display values only by index on the output display of debugger 28. In general, remote table 26A will contain human-readable names and optionally an index, hash or other identifier to be supplied with the read or modify requests sent to debug module 24 from debugger 28. The received read or modify requests are then satisfied by debug module 24 using a look-up of a storage location based on the index/hash or variable name provided by debugger 28 from remote table 26A, or for interpretive/scripting languages, by evaluating the value specified by the variable name provided by debugger 28 or a look-up of the variable name using an index, hash or other alias used in remote table 26A to represent an entry in local table 26. The information in remote table 26A can be loaded from a computer-readable media, or transmitted to debugger 28 from local table 26 (or other data source) through interface 18A that couples debugger 28 to workstation computer 10, which may be performed when a connection is established between debugger 28 and debug module 24, or at initialization of computer program 20. In one embodiment of the invention, in addition to the register( ) API, debug module 24 can support an unregister( ) API, in which case, a transmission to update remote table 26A may be required, unless it is desirable to merely fail requests to access program variables that are no longer registered. Further, while the exemplary embodiment above indicates that program variables would be registered generally at startup, and that in general, local table 26 would have a fixed set of entries, it is possible for computer program 20 to call the register API (and optionally the unregister API) on the fly to add or remove entries from local table 26. If such techniques are employed, it would generally be desirable to synchronize remote table 26A with local table 26 via update transmissions, and in particular if indexes are used and reassigned, such synchronization would be necessary. An example of such a use of on-the-fly program variable registration would be to only register variables in a region of program code that should not be entered under normal operating conditions. Such operation makes it possible to only expose selected program variables and only at certain times or when certain conditions, such as errors, have been encountered.

Debugger 28 retrieves and modifies values of program variables 22 within program 20 by transmitting read and modify commands to debug module 24, which then performs the requested operations if permissions are proper. The read command may take the form <cmd_read><index> or <cmd_read><variable_name> where index and variable_name are the identifiers and cmd_read is a constant identifying the command as a read command. In response, debug module 24 returns a packet of data containing the contents of the storage location associated with the program variable that was requested, which may be formatted with a header providing identifying information associated with the command that was sent, in order to permit asynchronous and buffered transmissions of requests. To modify a program variable, debugger sends a modify command, which may take the form <cmd_modify><index><data><size> or <cmd_modify><variable_name><data><size>, where cmd_ modify is a constant identifying the command as a modify command, where index and variable_name are the identifiers as above, data is the value to be written to the storage location associated with the program variable to be modified, and size is an optional value that provides a check as to whether the size of data matches the size of the variable to me modified.

Figure 3:
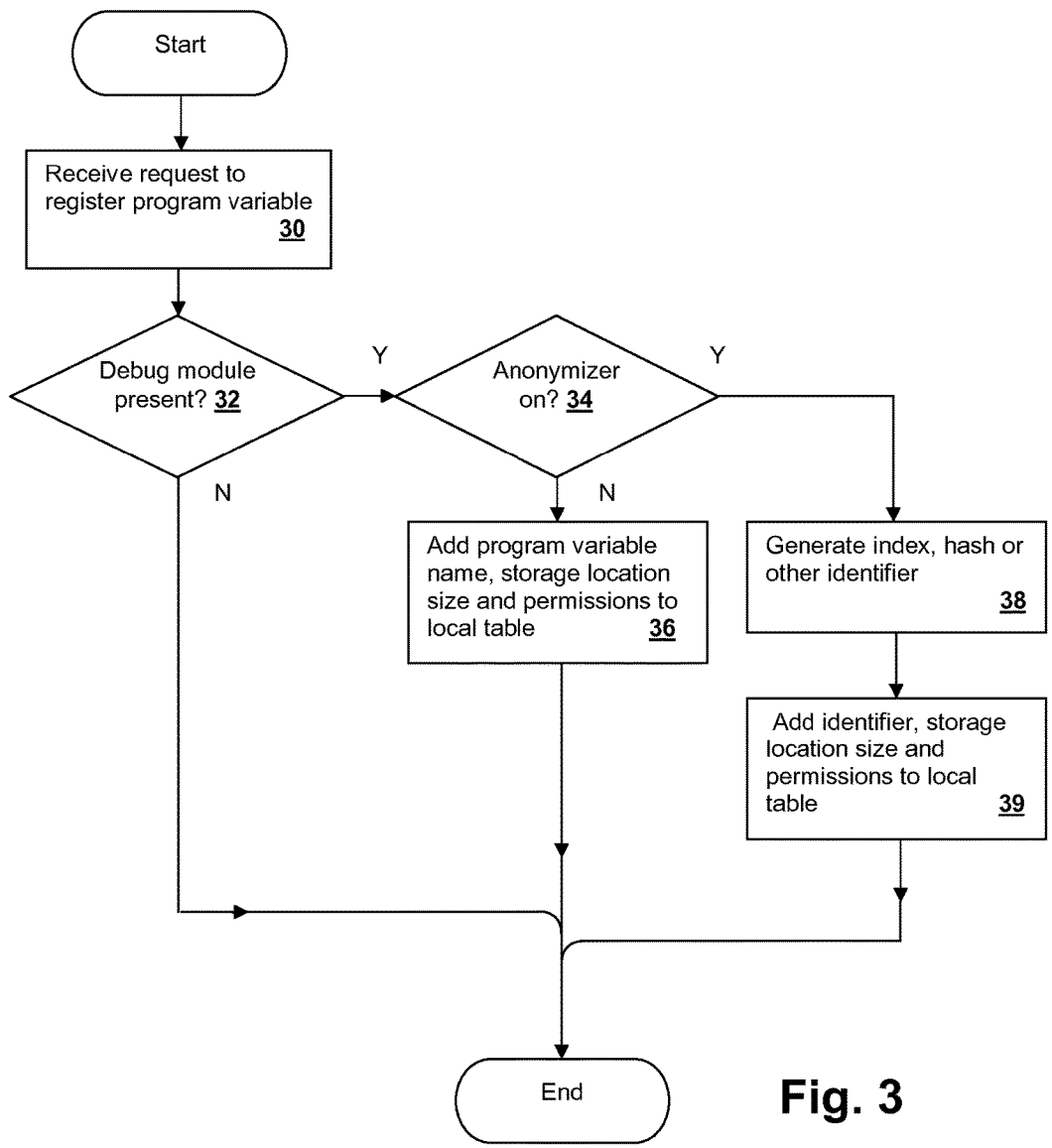
FIG. 3 is a flow chart depicting a method in accordance with an embodiment of the present invention.

Referring now to FIG. 3, a method for registering program variables with debug module 24 in accordance with an embodiment of the present invention is shown. When debug module 24 receives a request to register a program variable (step 30), if debug module 24 is not present (decision 32), then the request is not processed, which is accomplished by a stub or other technique as described above. If debug module 24 is present (decision 32) if anonymizing is selected (decision 34), an index, hash or other anonymous identifier is generated and associated with the program variable (step 38), and the storage location of the program variable, the identifier, the program variable size and permission flags are added to local table 26 (step 39). Otherwise, if anonymizing is not selected (decision 34), the storage location of the program variable, the program variable name, the program variable size and permission flags are added to local table 26 (step 40). While the method illustrated in FIG. 3 provides an example of how to register program variables in accordance with an embodiment of the present invention, other techniques may be employed as well, in accordance with other embodiments of the present invention.

Figure 4:
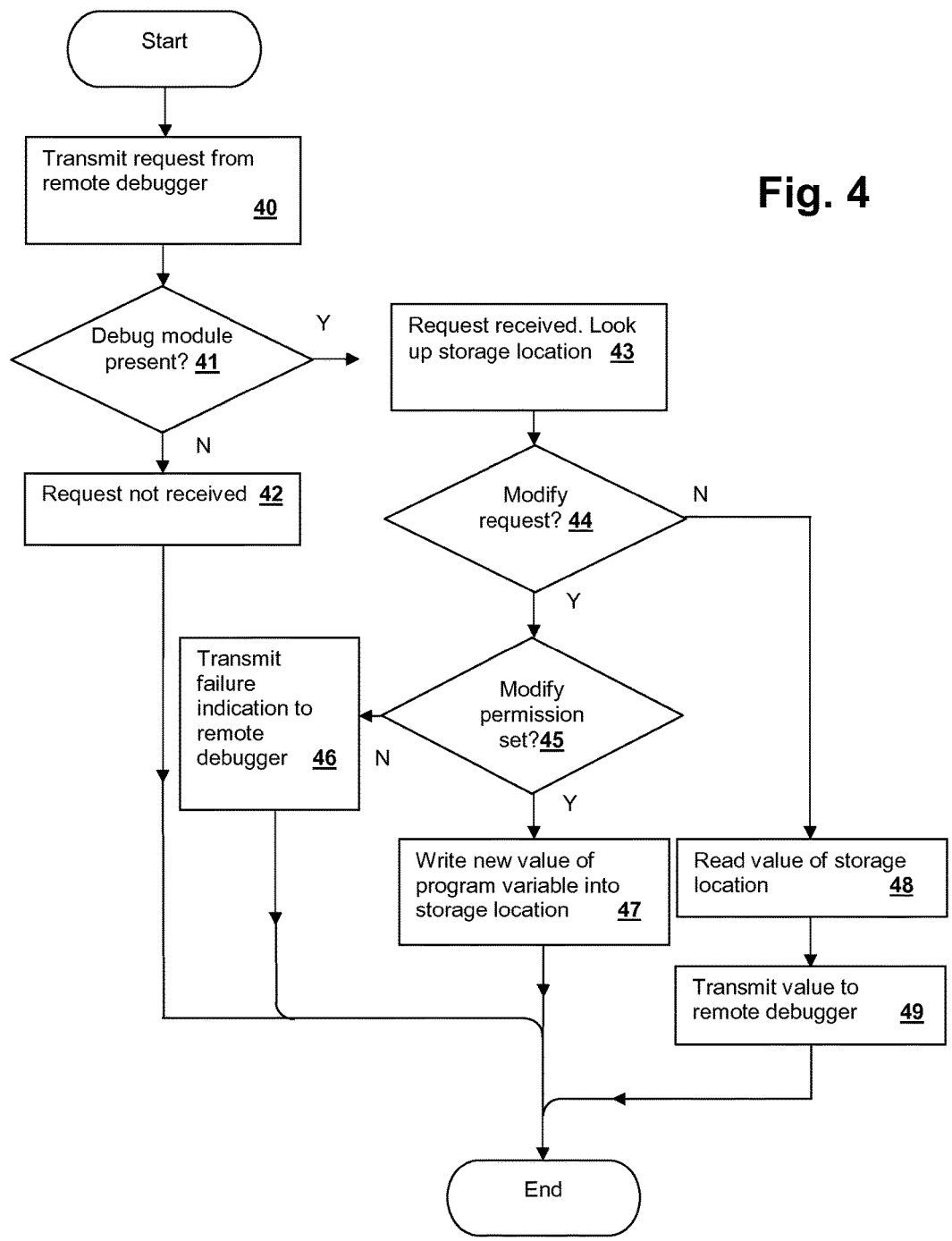
FIG. 4 is a flow chart depicting a method in accordance with another embodiment of the present invention.

Referring now to FIG. 4, a method for reading and modifying variables from debugger 28, in accordance with an embodiment of the present invention, is shown. When debugger 28 transmits a request to debug module 24 (step 40), if debug module 24 is not present (decision 41), then the request is not received (step 42) and no processing occurs.

If the debug module 24 is present (decision 41), the request is received and the storage location is looked up in local table 26 from the variable name or identifier provided with the request (step 43). If the request is a modify request (decision 44), the permissions are checked to determine whether permission to modify the program variable was set (decision 45). If modify permission was not set, then the request is failed (step 46), which may require a response to debugger 28 in some environments so that debugger 28 does not reflect an incorrect value for the program variable due to a failed modify operation. If modify permission was set for the program variable (decision 45), the new value supplied with the request is written into the storage location (step 47). If the request is a read request (decision 44), the value of the storage location is read (step 48) and is transmitted to debugger 28 (step 49). While the method illustrated in FIG. 4 provides an example of how to read and modify program variables in accordance with an embodiment of the present invention, other techniques may be employed as well, in accordance with other embodiments of the present invention.

As noted above, all or portions of the present invention may be embodied in a computer program product, which may include firmware, an image in system memory or another memory/cache, or stored on a fixed or re-writable media such as an optical disc having computer-readable code stored thereon. Any combination of one or more computer readable medium(s) may store the program in accordance with an embodiment of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of the present application, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A computer-performed method for observing data values within storage locations of a target computer program during execution of the target computer program within a computer system, the method comprising:
a processor of the computer system executing program instructions of the target computer program that communicate with a debugging module executing in the computer system by calling an application programming interface of the debugging module to register individual ones of the storage locations of the target computer program with the debugging module, wherein the debugging module program is located in the same address space in the computer system as the target computer program and linked to the target computer program, wherein the storage locations store corresponding ones of the data values;
receiving requests at the debugging module from an external debugger program, wherein the requests specify particular ones of the data values corresponding to storage locations of the target computer program that have been registered by the registering of the individual storage locations by the target computer program;
responsive to receiving the requests from the external debugger program, the debugging module retrieving the particular data values from their corresponding storage locations of the target computer program in the address space of the target computer program;
the debugging module completing the requests by sending the particular data values retrieved by the debugging module from the debugging module to the external debugger program; and
displaying the particular data values at a display accessible by the external debugger program.

2. The computer-performed method of claim 1, wherein the requests comprise both read and modify requests, wherein the retrieving, sending, completing and displaying are performed responsive to a read request, and wherein the method further comprises responsive to the receiving having received a modify request, the debugging module modifying one of the particular data values specified by the modify request by writing a value provided with the modify request in the storage location corresponding to the particular one of the data values.

3. The computer-performed method of claim 2, wherein the program instructions that communicate specify a permission from among at least read-only and read-write permissions, and wherein the method further comprises responsive to the receiving the modify request, the debugging module determining whether a permission associated with the particular one of the data values is read-only, and wherein the modifying is performed only if the permission associated with the particular one of the data values is not read-only.

4. The computer-performed method of claim 1, wherein the program instructions that communicate generate or receive index values associated with the data values and stores the index values, and wherein the requests specify the data values using their associated index values, whereby anonymity of variables of the target computer program corresponding to the storage locations is preserved.

5. The computer-performed method of claim 1, wherein the program instructions that communicate receive names of program variables associated with the data values, and wherein the requests specify the data values using their names.

6. The computer-performed method of claim 1, wherein the program instructions that communicate call an application programming interface of the debugging module.

7. The computer-performed method of claim 6, wherein the debugging module is selectively linked to the target computer program, depending on whether the target computer program is a debug version or a non-debug version.

8. A computer system comprising a processor for executing program instructions coupled to a memory for storing the program instructions, wherein the program instructions are program instructions for observing data values within storage locations of a target computer program during execution of the target computer program within the computer system, and wherein the program instructions comprise:

program instructions of the target computer program that communicate with a debugging module by calling an application programming interface of the debugging module to register individual ones of the storage locations of the target computer program with the debugging module, wherein the debugging module is located in the same address space in the computer system as the target computer program and linked to the target computer program, wherein the storage locations store corresponding ones of the data values;

program instructions of the debugging module that receive requests at the debugging module from an external debugger program, wherein the requests specify particular ones of the data values corresponding to the storage locations of the target computer program that have been registered by the registering of the individual storage locations by the target computer program;

program instructions of the debugging module that, responsive to receiving the request from the external debugger program, retrieve the particular data values from their corresponding storage locations in the address space of the target computer program; and program instructions of the debugging module program that complete the requests by sending the particular data values retrieved by the debugging module from the debugging module to the external debugger program.

9. The computer system of claim 8, wherein the requests comprise both read and modify requests, wherein the program instructions for retrieving, sending and completing are executed in response to a read request, and wherein the program instructions of the debugging module further comprise program instructions for modifying one of the particular data values specified by the modify request by writing a value provided with the modify request to the storage location corresponding to the particular one of the data values, responsive to the program instructions for receiving having received a modify request.

10. The computer system of claim 9, wherein the program instructions that communicate specify a permission from among at least read-only and read-write permissions, and wherein the program instructions of the debugging module further comprise program instructions for determining whether a permission associated with the particular one of the data values is read-only in response to the program instructions for receiving having received the modify request, and wherein the program instructions for modifying are executed only if the permission associated with the particular one of the data values is not read-only.

11. The computer system of claim 8, wherein the program instructions that communicate generate or receive index values associated with the data values and store the index values, and wherein the requests specify the data values using their associated index values, whereby anonymity of variables of the target computer program corresponding to the storage locations is preserved.

12. The computer system of claim 8, wherein the program instructions that communicate receive names of program variables associated with the data values, and wherein the requests specify the data values using their names.

13. The computer system of claim 8, wherein the program instructions that communicate call an application programming interface of the debugging module.

14. The computer system of claim 13, wherein the debugging module is selectively linked to the target computer program, depending on whether the target computer program is a debug version or a non-debug version.

15. A computer program product comprising a computer-readable storage device that is not a signal or carrier wave storing program instructions for execution by a computer system, wherein the program instructions are program instructions for observing data values within storage locations of a target computer program during execution of the target computer program within the computer system, wherein the program instructions comprise:

program instructions of the target computer program that communicate with a debugging module executing in the computer system by calling an application programming interface of the debugging module to register individual ones of the storage locations of the target computer program with the debugging module program, wherein the debugging module is located in the same address space in the computer system as the target computer program, wherein the storage locations store corresponding ones of the data values;

program instructions of the debugging module for receiving requests from an external debugger program, wherein the requests specify particular ones of the data values corresponding to storage locations of the target computer program that have been registered by the registering of the individual storage locations by the program instructions of the target computer program;

program instructions of the debugging module that, responsive to receiving the requests from the external debugger program, retrieve the particular data values from their corresponding storage locations of the computer system in the address space of the target computer program; and program instructions of the debugging module for completing the requests by sending the particular data values retrieved by the debugging module from the debugging module program to the external debugger program.

16. The computer program product of claim 15, wherein the requests comprise both read and modify requests, wherein the program instructions for retrieving, sending and completing are executed in response to a read request, and wherein the program instructions further comprise program instructions of the debugging module for modifying one of the particular data values specified by the modify request by writing a value provided with the modify request to the storage location corresponding to the particular one of the data values, responsive to the program instructions for receiving having received a modify request.

17. The computer program product of claim 16, wherein the program instructions that communicate specify a permission from among at least read-only and read-write permissions, and wherein the program instructions of the debugging module further comprise program instructions for determining whether a permission associated with the particular one of the data values is read-only in response to the program instructions for receiving having received the modify request, and wherein the program instructions for modifying are executed only if the permission associated with the particular one of the data values is not read-only.

18. The computer program product of claim 15, wherein the program instructions that communicate generate or receive index values associated with the data values and store the index values, and wherein the requests specify the data values using their associated index values, whereby anonymity of variables of the target computer program corresponding to the storage locations is preserved.

19. The computer program product of claim 15, wherein the program instructions that communicate call an application programming interface of the debugging module.

20. The computer program product of claim 19, wherein the debugging module is selectively linked to the target computer program, depending on whether the computer program is a debug version or a non-debug version.

\* \* \* \* \*